(12) United States Patent
Piehler et al.

(10) Patent No.: US 10,574,024 B2
(45) Date of Patent: Feb. 25, 2020

(54) OPTICAL MODULE, LASER AMPLIFIER SYSTEM, METHOD AND USE

(71) Applicant: Universität Stuttgart, Stuttgart (DE)

(72) Inventors: Stefan Piehler, Stuttgart (DE);
Benjamin Dannecker, Stuttgart (DE);
Jan-Philipp Negel, Stuttgart (DE);
André Loescher, Stuttgart (DE)

(73) Assignee: Universität Stuttgart, Stuttgart (DE)

( * ) Notice: Subject to any disclaimer, the term of this patent is extended or adjusted under 35 U.S.C. 154(b) by 302 days.

(21) Appl. No.: 15/494,102

(22) Filed: Apr. 21, 2017

(65) Prior Publication Data
US 2017/0310073 A1   Oct. 26, 2017

(30) Foreign Application Priority Data

Apr. 22, 2016 (EP) ................................. 16000921

(51) Int. Cl.
*H01S 3/23* (2006.01)
*H01S 3/00* (2006.01)
*H01S 3/06* (2006.01)

(52) U.S. Cl.
CPC .......... *H01S 3/2325* (2013.01); *H01S 3/0071* (2013.01); *H01S 3/0604* (2013.01)

(58) Field of Classification Search
CPC combination set(s) only.
See application file for complete search history.

(56) References Cited

U.S. PATENT DOCUMENTS

| | | | |
|---|---|---|---|
| 3,921,096 A | | 11/1975 | Chenausky |
| 4,093,924 A | * | 6/1978 | Farcy ...................... H01S 3/094 359/347 |
| 8,605,355 B2 | * | 12/2013 | Lundquist ......... H01S 3/094084 359/333 |
| 8,665,516 B2 | * | 3/2014 | Sarkisyan ............. H01S 3/2325 359/346 |
| 2003/0026315 A1 | | 2/2003 | Erhard et al. |
| 2006/0209918 A1 | * | 9/2006 | Wang .................... H01S 3/0604 372/70 |
| 2007/0116081 A1 | * | 5/2007 | Vetrovec ............... H01S 3/0604 372/99 |
| 2014/0111650 A1 | * | 4/2014 | Georgiev ............. G06T 3/4038 348/159 |
| 2014/0016662 A1 | | 9/2014 | Schad et al. |

* cited by examiner

*Primary Examiner* — Eric L Bolda
(74) *Attorney, Agent, or Firm* — Shook, Hardy & Bacon LLP

(57) ABSTRACT

The present invention relates to an optical module configured to be optically coupleable to a laser amplifier module, the optical module comprising an inner optical element having a plurality of M inner reflective elements arranged around a center of the inner optical element; and a plurality of N outer reflective elements arranged around the inner optical element, the plurality of N outer reflective elements being configured to face the inner optical element, wherein the plurality of M inner reflective elements and the plurality of N outer reflective elements are configured to provide an optical path for a laser beam.

15 Claims, 5 Drawing Sheets

OPTICAL MODULE, LASER AMPLIFIER SYSTEM, METHOD AND USE

CROSS-REFERENCE TO RELATED APPLICATIONS

This Non-Provisional Patent Application claims priority to co-pending European Patent Application No. 16000921.3, which was foreign filed on Apr. 22, 2016 and is titled "Optical Module, Laser Amplifier System, Method and Use," the contents of which is incorporated by reference herein in its entirety.

SUMMARY

The subject matter of the present application relates to laser amplifier systems, and more particular, to an optical module which allows to amplify a laser beam using a laser amplifier module multiple times by guiding the laser beam along an optical path defined by the optical module.

A standard approach for amplifying a laser beam with a laser amplifier system includes guiding a laser beam multiple times through a laser amplifier module, for example to a pumped laser amplifier module. Such a pumped laser amplifier module may comprise a cavity in which for example a thin-disk crystal is provided. The thin-disk crystal is optically pumped by a pump beam. The pump beam is reflected several times within the cavity so that the energy of the pump light of the pump beam can be transferred to, i.e. absorbed, and stored in the thin-disk crystal.

In order to amplify the laser beam, the laser beam is passed multiple times to and through the thin-disk crystal. Each time the laser beam passes the pumped thin-disk crystal, the laser beam absorbs a small portion of the energy transferred to and stored in the thin-disk crystal and is thus amplified.

The laser beam is for example generated by a seed laser which is optically coupled into the amplifier system. The laser beam is guided multiple times by a mirror array, which is optically coupled to the laser amplifier module, through an opening within the cavity of the laser amplifier module towards the pumped thin-disk crystal.

The width of the opening of the laser amplifier module and the distance between the thin-disk crystal and the opening determines a solid angle. In order to pass the laser beam from the mirror array to the thin-disk crystal, the mirror array needs to be arranged within the solid angle, i.e. within the field of view of the thin-disk crystal which is restricted by the opening of the cavity.

The limitation of the solid angle by the given physical circumstances, e.g. the size of the opening of the cavity, the diameter of the laser beam and/or the distance between the thin-disk crystal and the opening of the cavity, results in different drawbacks.

On the one hand, the number of mirrors within the mirror array are limited by the dimension of the mirror array and the required size for each mirror of the mirror array since the dimension of the mirror array needs to fit within the given solid angle. Thus, the number of mirrors is limited, which at the same time limits the number of available passes to amplify the laser beam.

On the other hand, increasing the distance between the cavity and the mirror array in order to provide the required number of mirrors for the desired amplification passes of the laser beam at a given solid angle results in a bulky and large laser amplifier system. Moreover, increasing the distance between the cavity and the mirror array also increases the length of the laser beam propagation making the laser beam prone to air circulation and vibrations as well as accumulating nonlinear phase-shift in case of high peak-power pulses.

Thus, it is an object of the invention to provide an improved optical module optically coupleable to a laser amplifier module allowing a compact design of a laser amplifier system.

The above objects are solved by the provision of an optical module, of a laser amplifier system, a method for amplifying a laser beam and the use of an optical module as defined in the independent claims. Preferred embodiments are defined in the dependent claims.

According to an aspect, an optical module is configured to be optically coupleable to a laser amplifier module, the optical module comprises: an inner optical element having a plurality of M inner reflective elements arranged around a center of the inner optical element; a plurality of N outer reflective elements arranged around the inner optical element, the plurality of N outer reflective elements being configured to face the inner optical element, wherein the plurality of M inner reflective elements and the plurality of N outer reflective elements are configured to provide an optical path for a laser beam.

The optical module of the present invention is optically coupleable to the laser amplifier module so that the optical module interacts with the laser amplifier module in order to amplify the laser beam. The laser beam is conventionally consisting of coherent electromagnetic waves.

The optical module of the present invention comprises an inner optical element having a plurality of M inner reflective elements. M represents a natural number. As an example, the optical module may comprise twenty, thirty or forty inner reflective elements. Preferably, the quantity of M inner reflective elements may be a multiple of 2, e.g. 2, 24, 32, 64 etc.

The inner reflective elements may have a reflective surface, wherein the reflective surface may have an oval, round and/or square shape. The reflective surface is however not limited to such shapes. The inner reflective elements are arranged around a center of the inner optical element in a substantially point-symmetric scheme. That is, the inner reflective elements may be disposed radially around the center of the inner optical element. A point-symmetric scheme may provide the best utilisation of the available space and/or solid angle. However, the invention is not limited to point-symmetric schemes. For example, the distance of different inner reflective elements to the center of the inner optical element may be different.

Furthermore, different inner and/or outer reflective elements may have different shapes and/or dimensions. The necessary dimensions and/or shape may depend on the beam size of the laser beam. The beam size of the laser beam may depend on the size of the pumped area in the thin-disk crystal, which may also determine the possible power level of the laser beam. Preferably, the inner and/or outer reflective elements may have a dimension of 2-times of the beam diameter of the laser beam as a minimum. For example, for a beam diameter of 3 mm the dimension/aperture of the inner and/or outer reflective elements may be 6 mm in all directions.

Preferably, the reflective surfaces of the inner reflective elements may face away from the center of the inner optical element such that the inner reflective elements may reflect the laser beam incident from the laser amplifier module towards the outer reflective elements. Furthermore, the inner reflective elements may reflect the laser beam incident from an outer reflective element towards the laser amplifier module. Thus, the inner optical element may optically couple the optical module with the laser amplifier module.

The optical module further comprises a plurality of N outer reflective elements. N is a natural number. As an example the optical module may comprise twenty, thirty or forty outer reflective elements.

The number of the outer reflective elements may correspond to the number of the inner reflective elements. Preferably, the number of N outer reflective elements may be M (number of inner reflective elements)−2, (N=M−2). Thus, the additional outer reflective elements may be used for beam shaping of the laser beam. However, the number of the outer reflective elements can be identical to the number of the inner reflective elements.

The outer reflective elements may each have a reflective surface, wherein the reflective surface may have an oval, round and/or square shape but the reflective surface is not limited to such shapes. The outer reflective elements are arranged around the inner optical element wherein the reflective surfaces of the outer reflective elements face the inner optical element such that the outer reflective element may receive and/or reflect the laser beam from and/or towards the inner optical element, respectively.

Thus, the plurality of M inner reflective elements and the plurality of N outer reflective elements provide an optical path for guiding the laser beam within the optical module and towards and/or from the laser amplifier module. In particular, the inner optical element may divert a laser beam incident from the laser amplifier module towards the plurality of N outer reflective elements. The inner optical element may divert the laser beam incident from the plurality of N outer reflective elements towards the laser amplifier module.

The number of the inner and outer reflective elements N and M may be proportional to the number of amplifications by the laser amplifier module. That is, when the number of the inner and outer reflective elements is increased, the number of iterations through the laser amplifier module is increased and thus, the amplification of the laser beam. In other words, with every iteration of the laser beam through the laser amplifier module the laser beam absorbs energy stored in the laser amplifier module. Thus, the energy density of the laser beam is amplified.

In particular, the inner optical element redirects the laser beam incident from the laser amplifier module towards the outer reflective elements. Advantageously, the distance between the inner optical module and the laser amplifier module may be reduced by positioning the inner optical element closer to the laser amplifier module within the solid angle defined by the laser amplifier module as compared to a conventional set-up of a disk laser. Thus, the available space determined by the solid angle of the laser amplifier module as described above is efficiently used resulting in a compact arrangement of the optical module.

Furthermore, the distance covered by the laser beam, which travels along the optical path through the laser amplifier module, the inner optical module and the outer reflective elements is reduced as compared to a conventional set-up. Due to the reduced distance the laser is less prone to air circulation and/or vibration. Thus, disturbance of the laser beam with air circulation and/or vibration can be reduced.

Furthermore, each inner reflective element of the plurality of M inner reflective elements may be configured to: reflect the laser beam incident from an outer reflective element towards the laser amplifier module, and reflect the laser beam incident from the laser amplifier module towards a corresponding outer reflective element of the plurality of N outer reflective elements.

The laser beam incident from an outer reflective element is reflected by the inner reflective element towards the laser amplifier module. The laser amplifier module may comprise the same cavity as described above, but is not limited to such cavities. In other words, the present application is not limited to a thin-disk laser. In particular, the reflected laser beam may pass the opening of the laser amplifier module as described above and may hit the thin-disk crystal under an angle of incidence in relation to a direction perpendicular to the surface of the thin-disk crystal. This direction can also be referred to as the thickness direction of the thin-disk crystal. Generally, this direction can be referred to as the perpendicular of the thin-disk crystal. A perpendicular extending from the center of the inner optical element may lie substantially on the perpendicular of the thin-disk crystal. The laser beam incident on the laser amplifier module, in particular incident on the thin-disk crystal, absorbs an amount of energy stored in the laser amplifier module. Thereby, the laser beam is amplified. Subsequently, the amplified laser beam is reflected by the laser amplifier module, for example the thin-disk crystal, under an angle of reflection in relation to the perpendicular of the thin-disk crystal. The angle of reflection is substantially equal to the angle of incidence and the angle of incidence and the angle of reflection may not exceed the solid angle determined by the laser amplifier module. The angle between the incident ray and the reflected ray of the laser beam is equal to the sum of the angle of incidence and the angle of reflection. Hence, the angle of incidence is the angle between the incident laser beam and the perpendicular to the reflecting surface. Accordingly, the angle of reflectance is the angle between the reflected laser beam and the perpendicular to the reflecting surface.

Generally, for the present application, "a perpendicular" of an object describes or defines a direction that is orthogonal to a surface of the object. Often, "the perpendicular" is a direction orthogonal to the biggest surface of the object. In that respect, the terms "perpendicular" and "normal" can be used as synonyms.

Since the laser beam is reflected by the laser amplifier module under the angle of reflection, the laser beam may be incident on a different inner reflective element different from the one inner reflective element that reflects the laser beam into the cavity. The different inner reflective element may be opposite to or, alternatively, adjacent to the inner reflective element from which the laser beam was reflected to the laser amplifier module in relation to the center of the inner optical element. Subsequently, the different inner reflective element may reflect the laser beam incident from the laser amplifier module towards a corresponding outer reflective element.

It is also possible that the laser is reflected back from the same inner reflective element.

Additionally, one or more of the plurality of inner reflective elements may have a different configuration. In particular, one of the inner reflective elements may be configured to couple the laser beam into the optical module. Thus, the optical element, and specifically this inner reflective element of the optical element may receive the laser beam from a laser source, for example from a seed laser and reflect the laser beam to the laser amplifier module.

Alternatively, one of the inner reflective elements may receive the laser beam from the laser source and reflect the laser beam to a corresponding outer reflective element, thereby coupling the (seed) laser into the optical module.

Furthermore, one of the inner reflective elements may be configured to decouple the laser beam from the optical module. In particular, an inner reflective element may reflect the laser beam incident from the laser amplifier module towards a destination, e.g. a work piece which is processed by laser welding.

Furthermore, an outer reflective element may be configured to reflect the laser beam incident from an inner reflective element towards a different outer reflective element; and the different outer reflective element is configured to reflect the laser beam towards a corresponding inner reflective element.

In other words, outer reflective elements which receive the laser beam from a corresponding inner reflective element may reflect the laser beam to a different outer reflective element. For example, the different outer reflective element may be an outer reflective element being arranged opposite or adjacent to the outer reflective element reflecting the laser beam to the different outer reflective element, wherein opposite refers to the arrangement of the outer reflective elements in relation to the perpendicular extending from the center of the inner optical element. That is, the opposite outer reflective element is point symmetrical to the outer reflective element reflecting the laser beam to the different outer reflective element. However, the invention is not limited to opposite or adjacent outer reflective elements.

Furthermore, the outer reflective elements may be disposed closer to the laser amplifier module as the inner optical element or farther away so that the laser beam reflected from one outer reflective element to another outer reflective element is not disturbed by the inner optical element.

Preferable, the angle of incidence of the laser beam incident on an inner reflective element from an outer reflective element may be substantially 45°. Furthermore, the angle of reflection may be substantially equal to the angle of incidence. Thus, the laser beam may be reflected from the inner reflective element under an angle of substantially 45° towards the laser amplifier module. Furthermore, the laser beam incident on an inner reflective element from the laser amplifier module may also be reflected under an angle of substantially 45° towards a corresponding outer reflective element.

Furthermore, the inner optical element may be arranged so that the angle of incidence on the thin-disk crystal of the laser beam incident from an inner reflective element is less than or equal to 7°. For this purpose, the distance between the inner optical element and the laser amplifier module may be chosen accordingly and/or the diameter of the inner optical element may be chosen accordingly. That is, in order to reduce the angle of incidence, the distance may be increased and/or the diameter may be reduced. Depending on the coating of the thin-disk crystal, the angle of incidence on the thin-disk crystal can have another value, particularly larger than 7°.

The laser beam incident on the different outer reflective element may be further reflected to a corresponding inner reflective element. Said corresponding inner reflective element reflects the laser beam back to the laser amplifier module from which the laser beam is subsequently reflected to another inner reflective element.

Thus, an iterative process is established where the laser beam is passed along an optical path from: an inner reflective element to the laser amplifier module, from the laser amplifier module to a different inner reflective element, from the different inner reflective element to a corresponding outer reflective element, from the corresponding outer reflective element to a different outer reflective element, from the different outer reflective element to a corresponding inner reflective element, and from this corresponding inner reflective element to the laser amplifier module.

As explained above, with every passing of the laser amplifier module the laser beam is amplified. The desired amplification is among others achieved by increasing the number of the inner and outer reflective elements which consequently increases the number of passes of the laser beam through the laser amplifier module.

Preferably, one outer reflective element of the plurality of N outer reflective elements may be configured to couple the laser beam into the optical module, and one different outer reflective element of the plurality of N outer reflective elements may be configured to decouple the laser beam from the optical module.

The laser beam which is coupled to the optical module may be received from an external laser source, e.g. a seed laser. After the (seed) laser beam has been coupled into the optical module by one of the outer reflective elements, the laser beam is guided through/in the above described optical path until the laser beam hits the outer reflective element which is configured to decouple the laser beam from the optical element. At this outer reflective element the amplified laser beam is decoupled from the optical module. In this embodiment, it may be possible to provide the plurality of M inner reflective elements in a different configuration as explained above. In particular, it may be sufficient, if one half of the plurality of M inner reflective elements may be configured to reflect the laser beam incident from an outer reflective element towards the laser amplifier module, and the other half of the plurality of M inner reflective elements may be configured to reflect the laser beam incident from the laser amplifier module towards a corresponding outer reflective element of the plurality of N outer reflective elements.

In other words, since the laser beam traverses through the optical module only once, i.e. from the outer reflective element coupling the laser beam into the optical module to the different outer reflective element decoupling the laser beam out of the optical module, each inner reflective element may be either configured to reflect the laser beam incident from the laser amplifier module towards the corresponding outer reflective element or configured to reflect the laser beam incident form the corresponding outer reflective element towards the laser amplifier module and subsequent inner reflective elements along the optical path are configured differently.

Alternatively, one outer reflective element of the plurality of N outer reflective elements may be configured to couple and decouple the laser beam into the optical module.

According to a further embodiment of the invention, one different outer reflective element of the plurality of N outer reflective elements may be configured to reflect the incident laser beam with a reflection angle of 0° and to rotate the polarisation of the laser beam.

Thus, after the laser beam has been coupled into the optical module by one of the outer reflective elements, the laser beam is guided through the above described optical path until the laser beam arrives at the different outer reflective element of the plurality of N outer reflective elements which is configured to reflect the incident laser beam with a reflection angle of 0° and to rotate the polarisation of the laser beam.

Consequently, the laser beam passes the above described optical path in the reverse direction until the laser beam is decoupled from the optical module. The laser beam may be decoupled from the optical module by the outer reflective element which couples the laser beam into the optical module. In particular, the rotated polarisation allows to separate the amplified laser beam from the incident laser beam of the laser source. Thus, the number of passes through the laser amplifier module and therefore also the number of amplifications may be doubled without increasing the number of the inner and outer reflective elements. That is, the amplification of the laser beam may be increased without increasing the number of the inner and outer reflective elements.

Furthermore, the optical module may comprise a resonator, e.g. an optical resonator, in order to avoid damage when the laser source, e.g. the seed laser, fails. In the case that the laser source fails, energy which is transferred from the pump light to the thin-disk crystal is not transferred to the laser beam. Thus, the thin-disk crystal may overheat and gets damaged. For this purpose, the resonator may be provided through the center of the inner optical element and may extract energy from the thin-disk crystal.

Additionally, the optical module may comprise surveillance means. The surveillance means may be provided through the center of the inner optical element. For instance, the surveillance means may comprise or be a camera. Thus, it is possible to observe the laser amplifier module, or rather the thin-disk crystal of the laser amplifier module.

Furthermore, the inner optical element may be mountable to a mounting device, such as a board. In particular, the backside of the inner optical element may be mountable to the board. The backside of the inner optical element is facing away from the laser amplifier module if the optical module is optically coupled to the laser amplifier module. The board may be suitable to dissipate heat resulting from partial absorption of the incident laser beam by the inner optical elements. Furthermore, the board may be provided with an opening which corresponds to the center of the inner optical element. Through the opening the surveillance means and/or the resonator may be inserted into the center of the inner optical element.

Furthermore, the optical module and the laser amplifier module may be arranged in a vertical alignment. That is, the optical module may be arranged above or below the laser amplifier module wherein the optical coupling between the optical module and the laser amplifier module is maintained. The vertical alignment is advantageous since the laser beam is affected less by gas in the laser amplifier module and/or optical module which rises in the vertical direction due to the heating caused by the operation of the laser amplifier module and/or the optical module. Hence, the gas flow direction may be substantially axial to the laser beam direction.

Furthermore, each outer reflective element of the plurality of N outer reflective elements may comprise adjusting means for adjusting the orientation of the respective outer reflective element. In particular, the adjusting means may be suitable to adjust the optical path of the laser beam between the inner optical element and any outer reflective element by adjusting the orientation of one or more outer reflective element(s).

Furthermore, each inner reflective element of the plurality of M inner reflective elements may comprise adjusting means for adjusting the orientation of the respective inner reflective element. In particular, the adjusting means may be suitable to adjust the optical path of the laser beam between the inner optical element and any outer reflective element by adjusting the orientation of one or more inner reflective element(s).

According to a further aspect, a laser amplifier system for amplifying a laser beam is provided. The laser amplifier system comprising: a laser amplifier module; and at least one optical module according to the invention.

As explained above, the at least one optical module may be optically coupled to the laser amplifier module wherein the laser amplifier module may be a thin-disk pump cavity. In other words, the perpendicular of the laser amplifier module, and in particular the perpendicular of the thin-disk crystal may lie on top of the perpendicular of the inner optical element extending from the center of the inner optical element. Thus, the laser beam incident under an angle of incidence to the laser amplifier module from an inner reflective element is reflected from the laser amplifier module towards a different inner reflective element with an angle of reflection which is substantially equal to the angle of incidence. Furthermore, a laser beam may be coupled into the at least one optical module and the laser beam may travel along an optical path defined by the at least one optical module and the laser amplifier module.

With every iteration of the laser beam through the laser amplifier module, the laser beam is amplified. Furthermore, the amplified laser beam may be decoupled by the optical module as described above.

Alternatively, the laser amplifier module may comprise a laser crystal and pumping means to pump the laser crystal and the laser amplifier system further comprises two optical modules according to the invention which are optically coupled to the laser amplifier module so that the laser amplifier module is located between the two optical modules.

The laser crystal may be for example a transmissive or reflective laser crystal being pumped by the pumping means, e.g. by a pump laser diode. The laser crystal is provided between the two optical modules and the two optical modules may face each other. In particular, the perpendicular extending from the center of the inner optical element of the first optical module may lie on the perpendicular extending from the center of the inner optical element of the second optical module. Additionally, the laser crystal may also lie on said perpendiculars.

Thus, the laser beam travels along an optical path defined by the two optical modules and the laser amplifier module. The laser beam incident towards the laser amplifier module from one optical module is passed through the laser amplifier module to the other optical module. The laser beam is amplified when passing through the laser amplifier module since the laser beam absorbs energy which is stored in the pumped laser crystal. In the other optical module, the laser beam travels along the optical path defined by the inner reflective elements and the outer reflective elements and is returned to the other optical module, thereby passing the laser amplifier module again. This process is repeated until the laser beam is decoupled from the optical module.

Alternatively, the laser amplifier system may comprise an external reflective element arranged opposite to the at least one optical module so that the laser amplifier module is located between the at least one optical module and the external reflective element. Preferably, the optical axis of the external reflective element lies on the perpendicular extending from the center of the inner optical element of the at least one optical module. The external reflective element may be a highly reflective element and may have a high reflectance specifically for the wavelength of the laser beam generated by a seed laser.

The external reflective element may reflect the laser beam incident from the laser amplifier module with an angle of reflection which is substantially equal to the angle of incidence. Thus, the laser beam which is passed from an inner reflective element of the at least one optical module through the laser amplifier module is reflected back to a different inner reflective element of the at least one inner optical element.

Preferably, the pumping means for pumping the laser crystal may be disposed in such a manner that the pump light of the pumping means may travel from the center of the inner optical element towards the laser crystal.

According to a further aspect, a laser resonator system for amplifying a laser beam is provided. The laser resonator system comprises: a laser amplifier system as disclosed above; and at least one reflective resonator element.

The laser amplifier system may be compared to a conventional optical medium of a laser resonator. A first reflective resonator element of the at least one reflective resonator element may be configured to receive a laser beam from the laser amplifier system, i.e. the optical medium, and may be further configured to reflect the received laser beam back to the laser amplifier system.

For example, the first reflective resonator element may be configured to receive the laser beam from a first outer reflective element of the plurality of N outer reflective elements and may be further configured to reflect the received laser beam back to the first outer reflective element. The laser amplifier system may be configured to guide the laser beam received from the first reflective resonator element through the laser amplifier system along the provided optical path. For example, the laser amplifier system may be configured to guide the laser beam from the first outer reflective element along the optical path, i.e. from the first outer reflective element (n) to the inner optical element, then to the laser amplifier module, then to the inner optical element, then to a corresponding outer reflective element (n+1), then to a different outer reflective element (n+2), then to the inner optical element, etc., and towards an outer reflective element (n+x) which reflects the laser beam back so that the laser beam is returned to the first reflective resonator element. In other words, the laser amplifier system may be configured to guide the laser beam back towards the first outer reflective element which may be configured to guide the laser beam towards the first reflective resonator element. That is, the laser beam may be repeatedly guided from the first reflective resonator element towards and through the laser amplifier system from where the laser beam is guided towards the first reflective resonator element.

Furthermore, the first reflective resonator element may be configured to decouple the laser beam from the laser resonator system. The laser beam may be further coupled to the laser resonator system by any one of the previously described techniques and/or by the first reflective resonator element.

In a further embodiment according to the invention, a second reflective resonator element may be provided. The second reflective resonator element may be configured to receive the laser beam from the laser amplifier system and may be configured to reflect the received laser beam towards the laser amplifier system. For example, the second reflective resonator element may be configured to receive the laser beam from a different outer reflective element and reflect the received laser beam back to the different outer reflective element. For example and without limiting the claimed subject-matter, the different outer reflective element may be opposite the first outer reflective element with respect to the center of the inner optical element.

In this case, the laser amplifier system may be configured to guide the laser beam received from the first reflective resonator element along the optical path towards the different outer reflective element from where the laser beam is guided towards the second reflective resonator element. Afterwards, the laser beam is guided back through the laser amplifier system towards the first reflective resonator element. Furthermore and without limiting the invention, the first and/or second reflective resonator element may be configured to couple and/or decouple the laser beam into/from the laser resonator system. However, the laser beam may also be coupled and/or decoupled from the laser resonator system as described above.

Furthermore, the first reflective resonator element and/or the second reflective resonator element may be mirror elements.

Alternatively, the laser resonator system may be configured to guide the laser beam from the second reflective resonator element towards the first reflective resonator element outside the laser amplifier system. That is, the laser beam may be guided from the first reflective resonator element towards the second reflective resonator element through the laser amplifier system and from the second reflective resonator element towards the first reflective resonator element outside the laser amplifier system.

Preferably, beam shaping may be applied to the laser beam. For this purpose beam shaping elements may be provided between the first and/or second reflective resonator elements and the respective corresponding outer reflective elements.

Alternatively, one of the outer reflective elements may be configured as the first reflective resonator element and/or another outer reflective element may be configured as the second reflective resonator element. In this case, the first and/or second reflective resonator elements may be configured to receive the laser beam from the inner optical element and may be configured to reflect the laser beam back to the inner optical element. Also in this configuration, the first reflective resonator element may be arranged opposite the second reflective resonator element with respect to the centre of the inner optical element. The optical path length of the provided resonator may be a multiple of the half wavelength of the incident laser beam.

Furthermore, the above described arrangements provide different configurations of a laser resonator system for creating the laser beam in the resonator system by passing the laser beam multiple times through the laser resonator system, i.e. laser oscillators instead of laser amplifiers. Thus, it is possible to provide a very compact laser with a low repetition rate, high pulse energy and high average output power. Due to the compactness of the system, the application of inert gases or use of a vacuum in the laser resonator systems is simplified when used as a laser oscillator.

According to a further aspect, a method for amplifying a laser beam is provided. The method comprising the steps of coupling the laser beam into a laser amplifier system by an optical module according to the invention, amplifying, by a laser amplifier module, the laser beam multiple times by guiding the laser beam along an optical path defined by the optical module, and decoupling, by the optical module, the laser beam from the laser amplifier system.

As explained above, the laser beam is coupled into the optical module. The laser beam may be generated by a seed laser. Next, the laser beam is guided along the optical path defined by the optical module. For this purpose the optical module may be optically coupled to the laser amplifier module and the laser beam may be guided along the optical path as explained above. Thus, with every iteration of the laser beam through the laser amplifier module, the laser beam is amplified by the laser amplifier module. After the laser beam has completed the optical path, the laser beam is decoupled from the optical module.

According to a further aspect, a method for using an optical module according to the invention with a laser amplifier module is provided.

The above and other objects, features and advantages of the present invention will become more apparent upon reading of the following detailed description of preferred embodiments and accompanying drawings. Other features and advantages of the subject-matter described herein will be apparent from the description, the drawings and from the claims. It should be understood that even though embodiments are separately described, single features thereof may be combined to additional embodiments.

DETAILED DESCRIPTION

The figures are a schematic representation, which are not up to scale and which may comprise parts that are enlarged or downsized for a better understanding. Further some parts may be omitted for better understanding.

Figure 1:
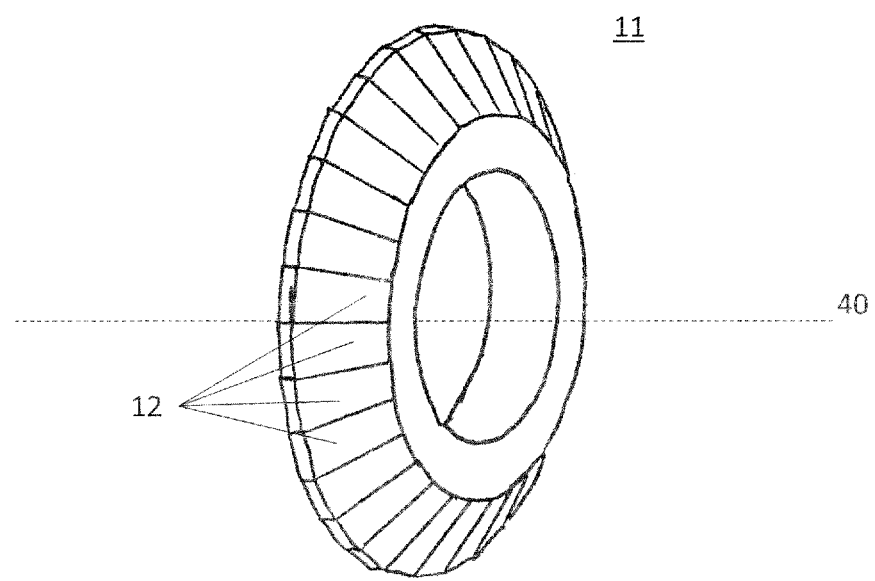
FIG. 1 shows an exemplary inner optical element.

FIG. 1 shows schematically the structure of an inner optical element 11 according to the invention. The inner optical element 11 comprises a plurality of M inner reflective elements 12 which are arranged around a center of the inner optical element. Preferably, the inner reflective elements 12 are arranged around the center of the inner optical element in a point-symmetric scheme. That is, the inner reflective elements 12 are disposed radially around the center of the inner optical element 11. M is a natural number.

Preferably, the inner optical element 11 may have the shape of a many sided truncated pyramid. Each side of the truncated pyramid represents or comprises an inner reflective element 12 of the plurality of M inner reflective elements. Furthermore, FIG. 1 depicts an optical axis/perpendicular 40 extending from the center of the inner optical element 11.

The inner reflective elements 12 face away from the center of the inner optical element 11. Without limiting the present disclosure, the inner reflective elements 12 may have a rectangular/trapezoidal shape. For example the inner reflective elements 12 may also have an oval, circular and/or any other suitable shape for reflecting the laser beam. The dimension of the inner reflective elements may be at least two times the beam diameter of the laser beam. For example, if the beam diameter of the laser beam is 2.5 mm, the dimension of the inner reflective elements 12 may be at least 5 mm×5 mm. That is, the aperture of the inner reflective elements 12 may be at least 5 mm. In the present example, the shown inner optical element 11 has an outer diameter of 72 mm which corresponds to 36 inner reflective elements 12 having an aperture of 6 mm. Furthermore, in the present example the shape of the inner reflective elements 12 is rectangular/trapezoidal with a dimension of 6 mm×10 mm.

Preferably, the inner reflective elements 12 may have a high reflective coating for reflecting the laser beam 50. For example, the reflectance of the inner reflective elements 12 may be 97% or higher and more preferably higher than 99%. Furthermore, the inner reflective elements 12 may have a low Group Delay Dispersion when reflecting the laser beam 50. Thus, spectral width pulses of the laser beam 50 do not diverge in time and the pulse duration of the laser pulses of the laser beam 50 does not increase due to being reflected at the inner reflective elements 12 and/or outer reflective elements 13. In particular, for the amplification of high average power ultrashort laser pulses, the inner reflective elements 12 may have a low Group Delay Dispersion, a high reflectance of >99.95% as well as low depolarization and high damage threshold.

The number of M inner reflective elements 12 is a natural number and is proportional to the number of iterations of the laser beam 50 through the laser amplifier module 20. That is, the desired level of amplification may be achieved by providing the appropriate number of inner reflective elements 12.

Preferably, an opening is provided in the center of the inner optical element 11. As explained above, surveillance means and/or an optical resonator may be installed through the opening and/or in the periphery of the opening.

Figure 2:
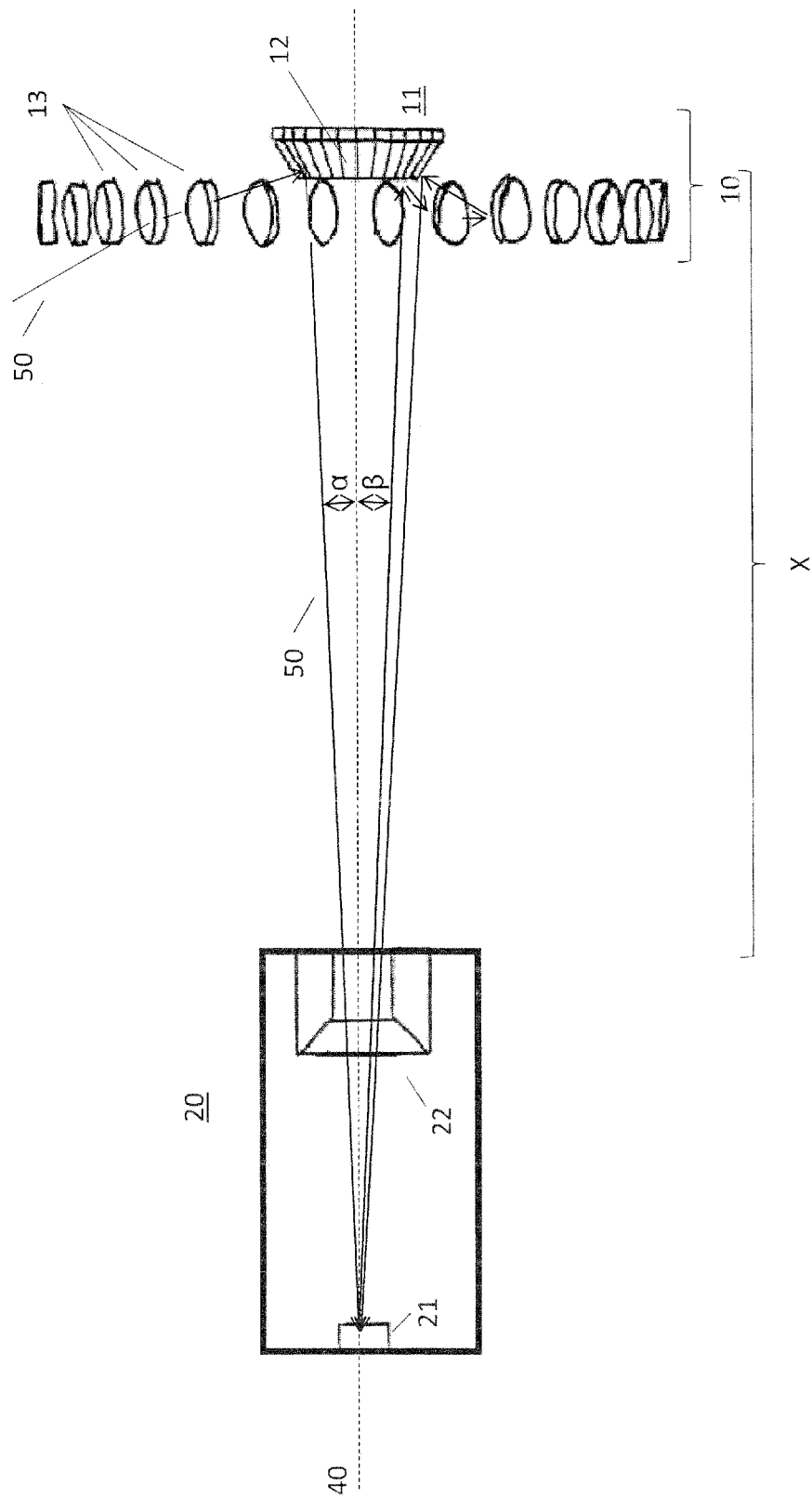
FIG. 2 shows an exemplary optical module optically coupled to a laser amplifier module.

FIG. 2 shows an exemplified laser amplifier system comprising an optical module 10 according to the invention and a laser amplifier module 20. The laser amplifier module 20 may be a known pumped thin-disk cavity as explained above. However, the laser amplifier module 20 is not limited to a pumped thin-disk cavity and may also be a pumped laser crystal with a geometry different than a thin-disk crystal, e.g. a transmissive bulk, rod or slab laser crystal.

The laser amplifier module may comprise a thin-disk crystal 21 and a parabolic mirror 22 provided in a cavity. The parabolic mirror 22 has an opening through which the laser beam is passed from the thin-disk crystal 21 to the inner optical element 11 and vice versa. Furthermore, the dimension of the opening of the parabolic mirror 22 and the distance between the thin-disk crystal 21 and the parabolic mirror 22 defines a solid angle.

Preferably, the optical module 10 may be optically coupled to the laser amplifier module 20 so that the inner reflective elements 12 may face the laser amplifier module 20 and the perpendicular extending from the center of the inner optical element 11 lies on an optical axis/perpendicular 40 of the laser amplifier module 20, in particular of a perpendicular extending from the thin-disk crystal 21 indicated by the dashed line 40. That is, both perpendiculars are identical (thus being identical reference numbers). Furthermore, the laser beam 50 incident on the laser amplifier module 20 from an inner reflective element is reflected under an angle of reflection β which is substantially equal to the angle of incidence α of the laser beam 50. Hence, the sum of α+β is equal to or smaller than the solid angle.

The optical module 10 further comprises a plurality of N outer reflective elements 13, wherein N is a natural number and may correspond or be equal to the number of M inner reflective elements 12. The outer reflective elements 13 may be arranged around the inner optical element 11 and face the inner optical element 11. That is, the outer reflective elements 13 may be disposed radially around the perpendicular 40 extending from the center of the inner optical element 11.

The inner reflective elements 12 receive the laser beam 50 from the laser amplifier module 20. Furthermore, the inner reflective elements 12 reflect the laser beam 50 incident from the laser amplifier module 20 towards the outer reflective elements 13. That is, the inner reflective element 12 redirects the laser beam 50 received from the laser amplifier module 20 and diverts the laser beam 50 to the outer reflective elements 13.

Preferably, the inner optical element 11 may be disposed within the solid angle defined by the laser amplifier module 20 and may be located close to the laser amplifier module 20. Thus, the optical module 10 according to the invention allows to provide a very compact laser amplifier system as compared to a conventional laser amplifier system.

Furthermore, the optical module 10 may be provided pre-configured. Hence, it is possible to provide the laser amplifier system on a modular basis.

Figure 3:
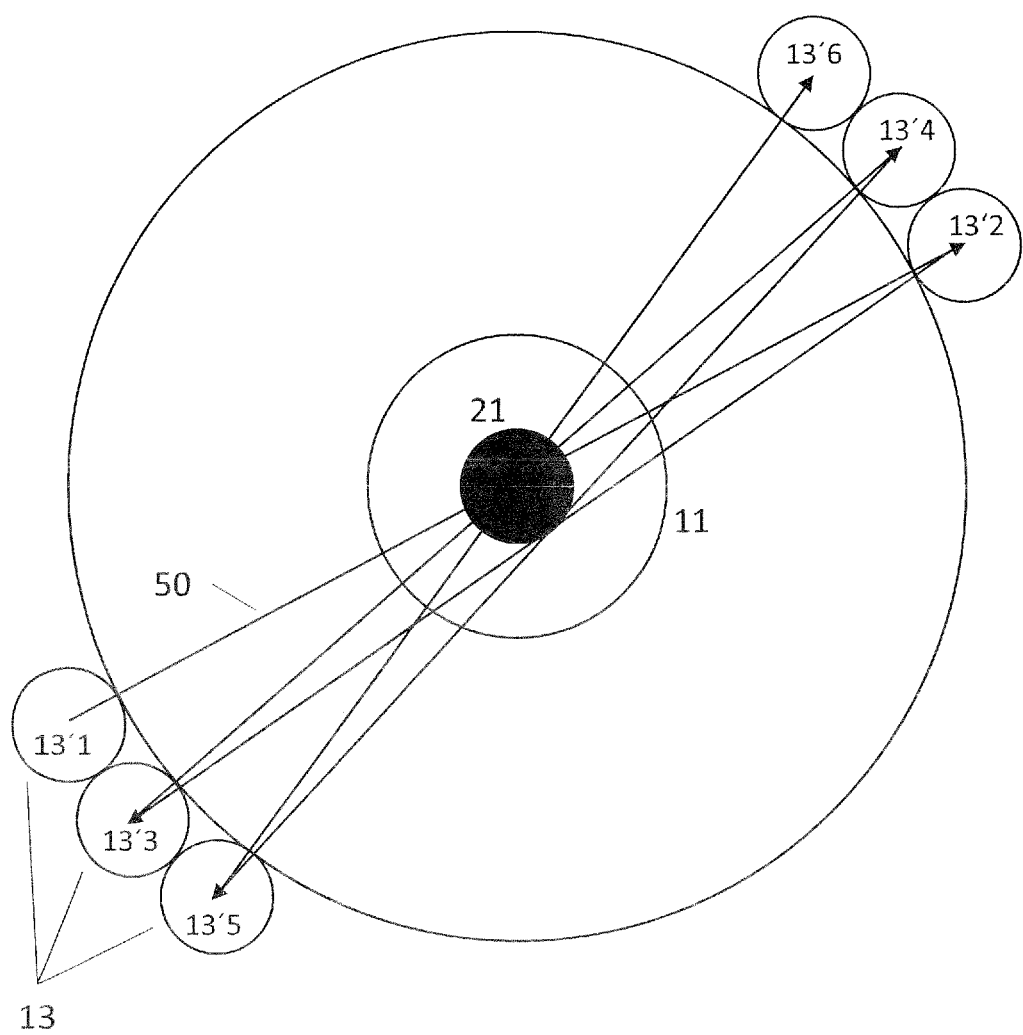
FIG. 3 shows an exemplary optical path.

Furthermore, an outer reflective element 13 which receives the laser beam 50 from a corresponding inner reflective element 12 may reflect the laser beam 50 towards a different outer reflective element 13. The different outer reflective element 13 may reflect the laser beam 50 towards a corresponding inner reflective element 12. The different outer reflective element 13 may be an outer reflective element 13 which is opposite to the outer reflective element 13 (from which it receives the laser beam 50) in relation to the optical axis/perpendicular 40. However, further configurations may be possible. For example, the different outer reflective element 13 may be an adjacent outer reflective element 13 as depicted in FIG. 2. As further example, FIG. 3 depicts a configuration where the different outer reflective element 13 is an opposite outer reflective element 13.

Furthermore, the different outer reflective element 13 reflects the received laser beam 50 towards a corresponding inner reflective element 12. Said (corresponding) inner reflective element 12 forwards the received laser beam 50 towards the laser amplifier module 20. The laser amplifier module 20 amplifies the laser beam 50 and reflects the laser beam 50 with an angle of reflection which is substantially equal to the angle of incidence towards a different inner reflective element 12.

Thus, the optical module 10 defines an optical path for guiding the laser beam 50. In particular, an iterative process is established where the laser beam 50 is passed through the optical path from: an inner reflective element 12 to the laser amplifier module 20, from the laser amplifier module 20 to a different inner reflective element 12, from the different inner reflective element 12 to a corresponding outer reflective element 13, from the corresponding outer reflective element 13 to a different outer reflective element 13, from the different outer reflective element 13 to a corresponding inner reflective element 12, and from this corresponding inner reflective element 12 to the laser amplifier module 20.

Furthermore, one of the outer reflective elements 13 may serve as a coupling means to couple the laser beam 50 into the optical module 10, wherein the laser beam 50 may be generated by a seed laser. Furthermore, one different outer reflective element 13 may serve as a decoupling means to decouple the laser beam 50 from the optical module 10. Hence, the laser beam 50 is guided along the optical path from a first outer reflective element 13 which couples the laser beam 50 into the optical module until the laser beam 50 is decoupled by the last outer reflective element 13.

Alternatively, one of the outer reflective elements 13 (first outer reflective element 13) may serve as a coupling means to couple the laser beam 50 into the optical module 10 and simultaneously as a decoupling means to decouple the laser beam 50 from the optical module 10. Furthermore, one different outer reflective element 13 (last outer reflective element 13) may reflect the received laser beam 50 at an angle of 0° and rotate the polarisation of the laser beam 50. Hence, the laser beam 50 passes the optical path defined by the optical module 10 until the laser beam 50 hits the last outer reflective element 13. Since the laser beam 50 is reflected at an angle of 0° the laser beam is guided backwards to the optical path defined by the optical module 10. When the laser beam 50 reaches the first outer reflective element 13, the laser beam 50 is decoupled by the first outer reflective element 13 due to the rotated polarization.

Alternatively, the laser beam 50 may be coupled into the optical module 10 by using an inner reflective element 12. Furthermore, a different inner reflective element may be configured to decouple the laser beam 50 into the optical module 10.

The laser amplifier system shown in FIG. 2 provides a very compact set-up as compared to a conventional laser amplifier system. The distance X between the inner optical element 11 and the laser amplifier module 20 is substantially 240 mm, the outer diameter of the inner optical element 11 is 72 mm and the outer reflective elements 13 are arranged circularly having a diameter of 240 mm. Preferably, the diameter of the inner optical element may be in the range of 50 mm-150 mm and the diameter of the cross-section described by the arrangement of the outer reflective elements 13 may be in the range of 240 mm-500 mm. However, both diameters are not limited to these values and depend in general on the beam size/diameter of the laser beam and therefore on the power level.

FIG. 3 shows an exemplary optical path through a laser amplifier system. The inner reflective elements of the inner optical element 11 face away from a viewer of FIG. 3 and through the opening of the inner optical element 11 the thin-disk crystal is visible. The optical path of the laser beam 50 is defined by the outer reflective elements 13 and the inner optical element 11. One outer reflective element 13'2 reflects the laser beam 50 incident from the inner optical element 11 towards a different outer reflective element 13'3 which is opposite to the one outer reflective element 13'2. Thus, the plurality of N outer reflective elements 13 may be provided closer to the thin-disk crystal 21 than the inner optical element 11 so that the laser beam reflected from the one outer reflective element 13'2 to the different outer reflective element 13'3 is not disturbed by the inner optical element 11. Furthermore, this configuration is advantageous since the plurality of N outer reflective elements 13 may have the same configuration in terms of reflection angle and/or coating.

As shown in FIG. 3, the laser beam 50 is coupled into the optical module 10 by the outer reflective element denoted with the reference sign 13'1. The laser beam 50 is guided to an inner reflective element (first inner reflective element) of the inner optical element 11. From this inner reflective element (not shown in this figure) the laser beam 50 is reflected towards the laser amplifier module (not shown in this figure), in particular to the thin-disk crystal 21 where the laser beam 50 incidents with an angle of incidence. The laser amplifier module reflects the laser beam with an angle of reflection which is substantially equal to the angle of incidence towards a different inner reflective element which is point symmetric to the first inner reflective element. The different inner reflective element reflects the laser beam 50 towards a different outer reflective element denoted by the reference sign 13'2 which is opposite to the outer reflective element 13'1 in relation to the center of the inner optical element 11.

The outer reflective element 13'2 reflects the laser beam 50 to an opposite outer reflective element denoted with the reference sign 13'3. From this outer reflective element 13'3 the above steps are repeated. The laser beam 50 is reflected to a corresponding inner reflective element. From the corresponding inner reflective element the laser beam 50 is reflected to the laser amplifier module which reflects the laser beam 50 to a different inner reflective element. The different inner reflective element reflects the laser beam 50 towards the outer reflective element denoted with the reference sign 13'4 which reflects the laser beam 50 towards the opposite outer reflective element denoted with the reference sign 13'5. From this outer reflective element 13'5 the next iteration starts. The outer reflective element 13'5 reflects the laser beam 50 towards a corresponding inner reflective element which reflects the laser beam 50 towards the laser amplifier module. The laser amplifier module reflects the laser beam 50 towards an opposite inner reflective element which reflects the laser beam 50 towards a corresponding outer reflective element denoted by the reference sign 13'6.

Hence, the optical path defined by the optical module generates an iterative pattern which the laser beam 50 follows. Thereby, the laser beam 50 is guided along all of the inner reflective elements and the outer reflective elements 13 in the above described manner.

Figure 4:
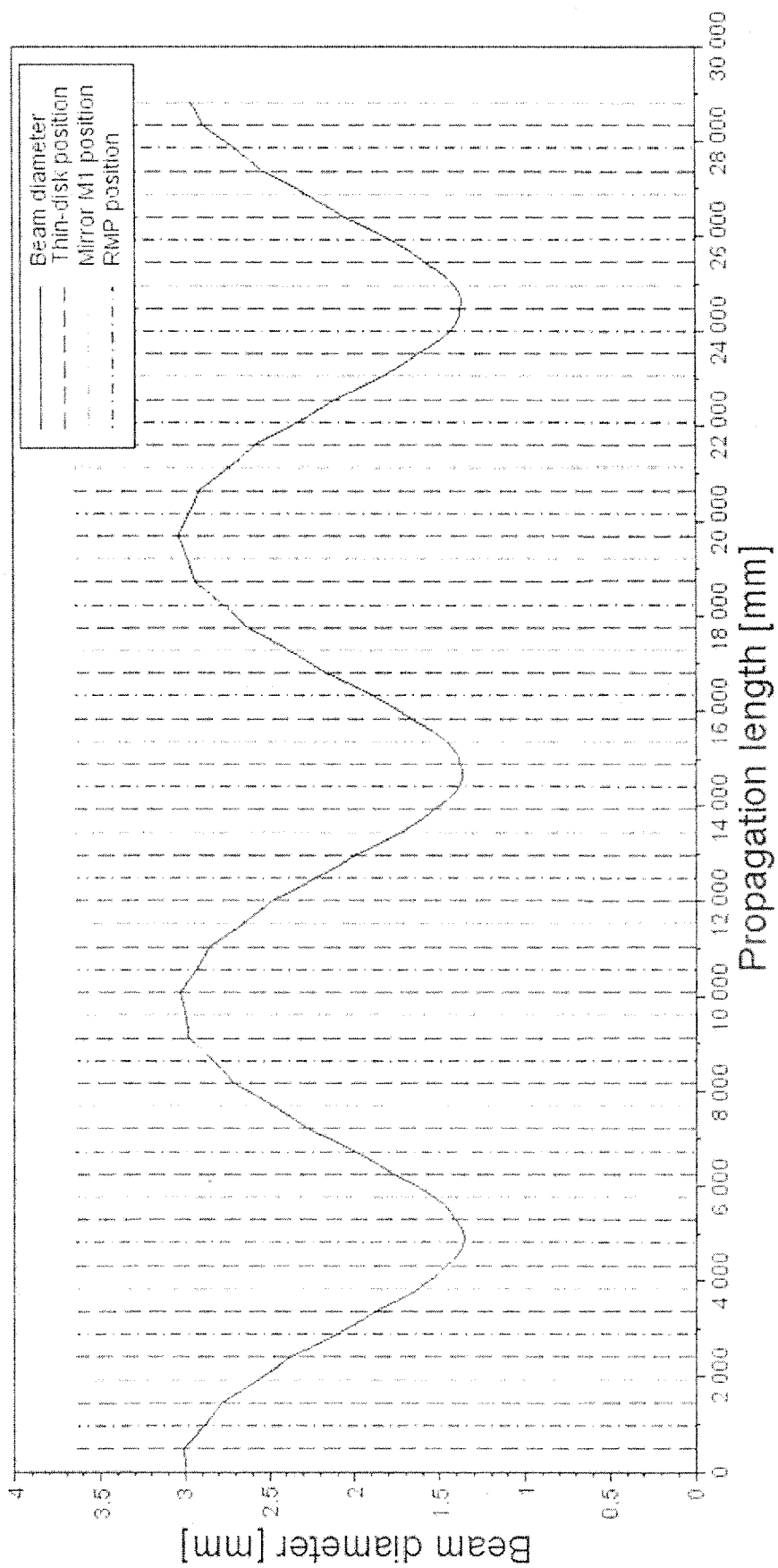
FIG. 4 shows a laser beam propagation of an exemplary laser amplifier system.

FIG. 4 shows a simulation of a laser beam propagation through a laser amplifier system according to the invention. As can be seen from the ordinate, the seed laser generates a laser beam having a diameter of 3 mm. Among other things, the possible output power is determined by the diameter of the generated laser beam. In the provided example, the inner optical element may have a diameter of 72 mm when placed 240 mm away from the thin-disk crystal. The plurality of N outer reflective elements are arranged circular around the inner optical element that may have a diameter of 240 mm. The laser beam propagation follows the concept of propagation of a collimated laser beam which is advantageous for the amplification and achieving of high power outputs, in particular when the laser beam is operated in a pulsed mode.

Thus, the optical module 10 may be designed in a very compact way, e.g. as a box, which may easily be mounted to the laser amplifier module 20. Following the above concept, scaling to higher power outputs may be achieved by increasing the dimension of the inner reflective elements and of the outer reflective elements so that the dimension of the inner reflective elements and of the outer reflective elements is big enough to fit the diameter of the laser beam.

Furthermore, from FIG. 4 it is noticeable that the propagation of a collimated laser beam avoids very small beam diameters. In addition, the oscillation of the beam diameter is reduced when the thin-disk crystal introduces a thermal lens due to increased pump power with this propagation concept. The latter effect is not depicted in FIG. 4.

According to another preferred embodiment of a laser amplifier system of the present invention, a plurality of optical modules is optically coupled to a laser amplifier module. Thus, the number of iterations which the laser beam passes through the laser amplifier module may be further increased.

Figure 5:
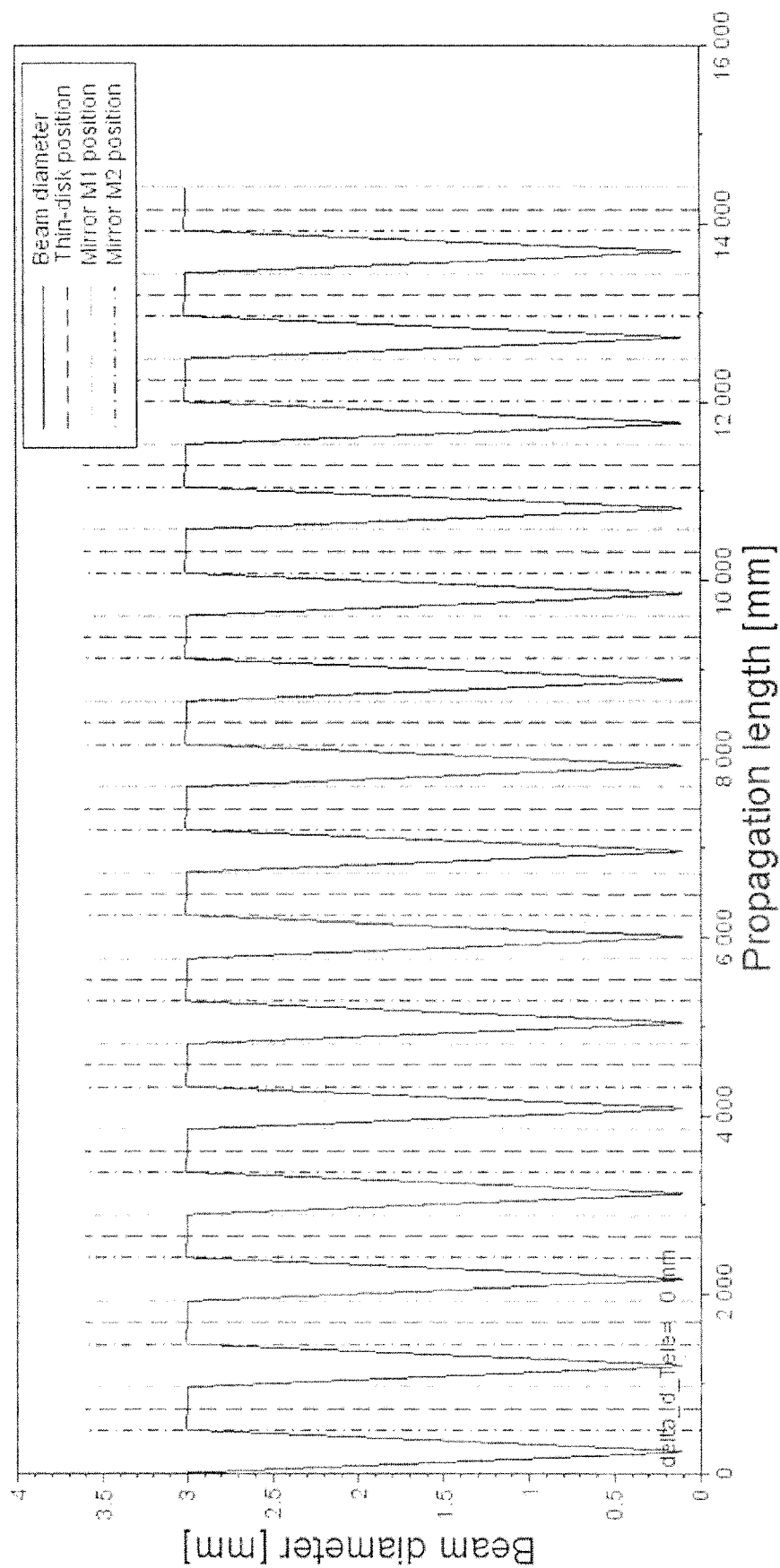
FIG. 5 shows a laser beam 4f propagation.

FIG. 5 depicts a laser beam 4f propagation of a laser amplifier module having a parabolic mirror arranged 240 mm away from the laser amplifier module as comparison to an embodiment of the present disclosure provided in a 4f arrangement. In a 4f arrangement of the present disclosure, the outer reflective elements may be spherical mirrors each having a focal length f. The outer reflective elements may be arranged such that the distance between the thin-disk crystal 21, the inner reflective element 12 and the corresponding outer reflective element 13'2 is 1f, i.e. equal to the focal length of the outer reflective element, the distance between the corresponding outer reflective element 13'2 and another outer reflective element 13'3 is 2f, i.e. two times the focal length of the outer reflective element, and the distance between the other outer reflective element 13'3, the inner reflective element 12 and the thin-disk crystal 21 is 1f, i.e. one time the focal length. As can be seen from FIG. 5, the arrangement of a laser amplifier module with a parabolic mirror causes very small focuses which shall be avoided for the amplification of pulsed laser beams. Furthermore, the angle of inclination to the outer reflective elements 13 may be substantially 0° and thus, the outer reflective elements may be curved spherical mirrors or plane mirrors.

A number of embodiments have been described. Nevertheless, it will be understood that various modifications may be made. Accordingly, other embodiments are within the scope of the claims.

REFERENCE SIGNS LIST

10 optical module
11 inner optical element
12 inner reflective element
13 outer reflective element
20 laser amplifier module
21 thin-disk crystal
22 parabolic mirror
40 optical axis/perpendicular
50 laser beam
α angle of incidence
β angle of reflection

What is claimed is:

1. An optical module configured to be optically coupleable to a laser amplifier module, the optical module comprising:
    an inner optical element having a plurality of M inner reflective elements arranged around a center of the inner optical element, the plurality of M inner reflective elements being configured to face the laser amplifier module;
    a plurality of N outer reflective elements arranged around the inner optical element, the plurality of N outer reflective elements being configured to face the inner optical element,
    wherein the plurality of M inner reflective elements and the plurality of N outer reflective elements are configured to provide an optical path for a laser beam.

2. The optical module according to claim 1, wherein each inner reflective element of the plurality of M inner reflective elements is configured to:
    reflect the laser beam incident from an outer reflective element towards the laser amplifier module, and
    reflect the laser beam incident from the laser amplifier module towards a corresponding outer reflective element of the plurality of N outer reflective elements.

3. The optical module according to claim 1, wherein one half of the plurality of M inner reflective elements is configured to reflect the laser beam incident from an outer reflective element towards the laser amplifier module, and wherein the other half of the plurality of M inner reflective elements is configured to reflect the laser beam incident from the laser amplifier module towards a corresponding outer reflective element of the plurality of N outer reflective elements.

4. The optical module according to claim 1, wherein:
    an outer reflective element is configured to reflect the laser beam incident from an inner reflective element towards a different outer reflective element; and the different outer reflective element is configured to reflect the laser beam towards a corresponding inner reflective element.

5. The optical module according to claim 1, wherein one outer reflective element of the plurality of N outer reflective elements is configured to couple the laser beam into the optical module, and one different outer reflective element of the plurality of N outer reflective elements is configured to decouple the laser beam from the optical module.

6. The optical module according to claim 1, wherein one outer reflective element of the plurality of N outer reflective elements is configured to couple and decouple the laser beam into the optical module, and one different outer reflective element of the plurality of N outer reflective elements is configured to reflect the laser beam with a reflection angle of 0° and to rotate a polarisation of the laser beam.

7. The optical module according to claim 1, wherein one inner reflective element of the plurality of M inner reflective elements is configured to couple the laser beam into the optical module.

8. The optical module according to claim 1, wherein the optical module further comprises a surveillance means and/or a resonator, and/or wherein the inner optical element is mountable to a board.

9. The optical module according to claim 1, wherein each outer reflective element of the plurality of N outer reflective elements comprises an adjusting means for adjusting an orientation of the outer reflective element.

10. The optical module according to claim 1, wherein the laser beam is generated with a seed laser.

11. A laser amplifier system for amplifying a laser beam comprising:
a laser amplifier module; and
at least one optical module according to claim 1 optically coupled to the laser amplifier module.

12. The laser amplifier system according to claim 11, wherein the laser amplifier module is a thin-disk pump cavity.

13. The laser amplifier system according to claim 11, wherein the laser amplifier module comprises:
a laser crystal, and
a pumping means to pump the laser crystal,
wherein the laser amplifier system further comprises:
two optical modules according to claim 1 optically coupled to the laser amplifier module so that the laser amplifier module is located between the two optical modules; or
an external reflective element arranged opposite to the at least one optical module so that the laser amplifier module is located between the at least one optical module and the external reflective element.

14. A method for amplifying a laser beam, comprising:
coupling, by an optical module according to claim 1, the laser beam into a laser amplifier system;
amplifying, by a laser amplifier module, the laser beam multiple times by guiding the laser beam along an optical path defined by the optical module; and
decoupling, by the optical module, the laser beam from the laser amplifier system.

15. A method of using an optical module according to claim 1 with a laser amplifier module, the method comprising:
coupling a laser beam into the optical module, and
amplifying the laser beam by guiding the laser beam along an optical path defined by the optical module.

* * * * *